(12) United States Patent
Han et al.

(10) Patent No.: US 11,341,066 B2
(45) Date of Patent: May 24, 2022

(54) CACHE FOR ARTIFICIAL INTELLIGENCE PROCESSOR

(71) Applicant: ELECTRONICS AND TELECOMMUNICATIONS RESEARCH INSTITUTE, Daejeon (KR)

(72) Inventors: Jin Ho Han, Seoul (KR); Min-Seok Choi, Daejeon (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/119,387

(22) Filed: Dec. 11, 2020

(65) Prior Publication Data
US 2021/0182222 A1 Jun. 17, 2021

(30) Foreign Application Priority Data

Dec. 12, 2019 (KR) .................. 10-2019-0165924
Nov. 27, 2020 (KR) .................. 10-2020-0162944

(51) Int. Cl.
*G06F 13/16* (2006.01)
*G06F 12/02* (2006.01)
*G06F 12/1081* (2016.01)
*G06F 13/28* (2006.01)

(52) U.S. Cl.
CPC ...... *G06F 13/1673* (2013.01); *G06F 12/0238* (2013.01); *G06F 12/1081* (2013.01); *G06F 13/28* (2013.01)

(58) Field of Classification Search
CPC .................................................. G06F 13/1673
USPC .......................................................... 711/154
See application file for complete search history.

(56) References Cited

U.S. PATENT DOCUMENTS

| | | | | |
|---|---|---|---|---|
| 3,248,708 A | * | 4/1966 | Haynes | G06F 12/0897 711/118 |
| 5,893,159 A | * | 4/1999 | Schneider | G06F 9/5016 711/150 |
| 5,966,734 A | * | 10/1999 | Mohamed | G06F 12/0897 711/173 |
| 6,427,201 B1 | * | 7/2002 | Ohba | G06F 13/28 712/22 |
| 6,591,335 B1 | | 7/2003 | Sade et al. | |

(Continued)

*Primary Examiner* — Titus Wong

(57) ABSTRACT

Disclosed is a cache including a dataflow controller for transmitting first data to a first processor and receiving second data from the first processor, an external direct memory access (DMA) controller for receiving the first data from an external memory to transmit the first data to the dataflow controller and receiving the second data from the dataflow controller to transmit the second data to the external memory, a scratchpad memory for storing the first data or the second data transmitted between the dataflow controller and the external DMA controller, a compression/decompression device for compressing data to be transmitted from the scratchpad memory to the external memory and decompressing data transmitted from the external memory to the scratchpad memory, and a transfer state buffer for storing transfer state information associated with data transfer between the dataflow controller and the external DMA controller.

9 Claims, 5 Drawing Sheets

(56) References Cited

U.S. PATENT DOCUMENTS

| | | |
|---|---|---|
| 8,205,046 B2 | 6/2012 | Shaw et al. |
| 2002/0135583 A1* | 9/2002 | Ohba ................. G06F 13/28 |
| | | 345/505 |
| 2005/0149665 A1* | 7/2005 | Wolrich ............. G11C 7/1006 |
| | | 711/105 |
| 2006/0059310 A1* | 3/2006 | Asher ............... G06F 12/0875 |
| | | 711/126 |
| 2012/0137079 A1 | 5/2012 | Ueda |
| 2013/0238859 A1 | 9/2013 | Han |
| 2019/0272460 A1 | 9/2019 | Tao |
| 2019/0373264 A1 | 12/2019 | Chong et al. |
| 2020/0133854 A1 | 4/2020 | Yang et al. |

* cited by examiner

CACHE FOR ARTIFICIAL INTELLIGENCE PROCESSOR

CROSS-REFERENCE TO RELATED APPLICATIONS

This application claims priority under 35 U.S.C. § 119 to Korean Patent Application No. 10-2019-0165924 filed on Dec. 12, 2019 and Korean Application No. 10-2020-0162944 filed on Nov. 27, 2020, in the Korean Intellectual Property Office, the disclosures of which are incorporated by reference herein in their entireties.

BACKGROUND

Embodiments of the present disclosure described herein relate to a cache, and more particularly, relate to a cache for an artificial intelligence (AI) processor.

An AI processor refers to a processor for processing AI algorithms. AI algorithm is an algorithm that computes feature data and kernel data based on a specific network structure. Because the AI algorithm has a large amount of data, the AI processor has been developed as hardware for accelerating computations. Because not only the amount of feature data and kernel data, but also the amount of output feature data that is an intermediate result of computation is also large, it is difficult to store data in only the storage device inside an AI processor, and data is also frequently stored in an external memory. Accordingly, there is a need for a large amount of external memory, and a speed of reading and writing the external memory needs to be fast. However, because the speed of reading and writing the external memory is limited, there is a need for the function to reduce the number of times that the external memory is read and written.

SUMMARY

Embodiments of the present disclosure provide a cache for an AI processor that compresses feature data and kernel data, which are targets of the computation of an AI algorithm, to store the feature data and the kernel data in an external memory, and reduces the number of times that the external memory is read and written.

According to one embodiment, a cache includes a dataflow controller for transmitting first data to a first processor and receiving second data from the first processor, an external direct memory access (DMA) controller for receiving the first data from an external memory to transmit the first data to the dataflow controller and receiving the second data from the dataflow controller to transmit the second data to the external memory, a scratchpad memory for storing the first data or the second data transmitted between the dataflow controller and the external DMA controller, a compression/decompression device for compressing data to be transmitted from the scratchpad memory to the external memory and decompressing data transmitted from the external memory to the scratchpad memory, and a transfer state buffer for storing transfer state information associated with data transfer between the dataflow controller and the external DMA controller.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Components that are described in the detailed description with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
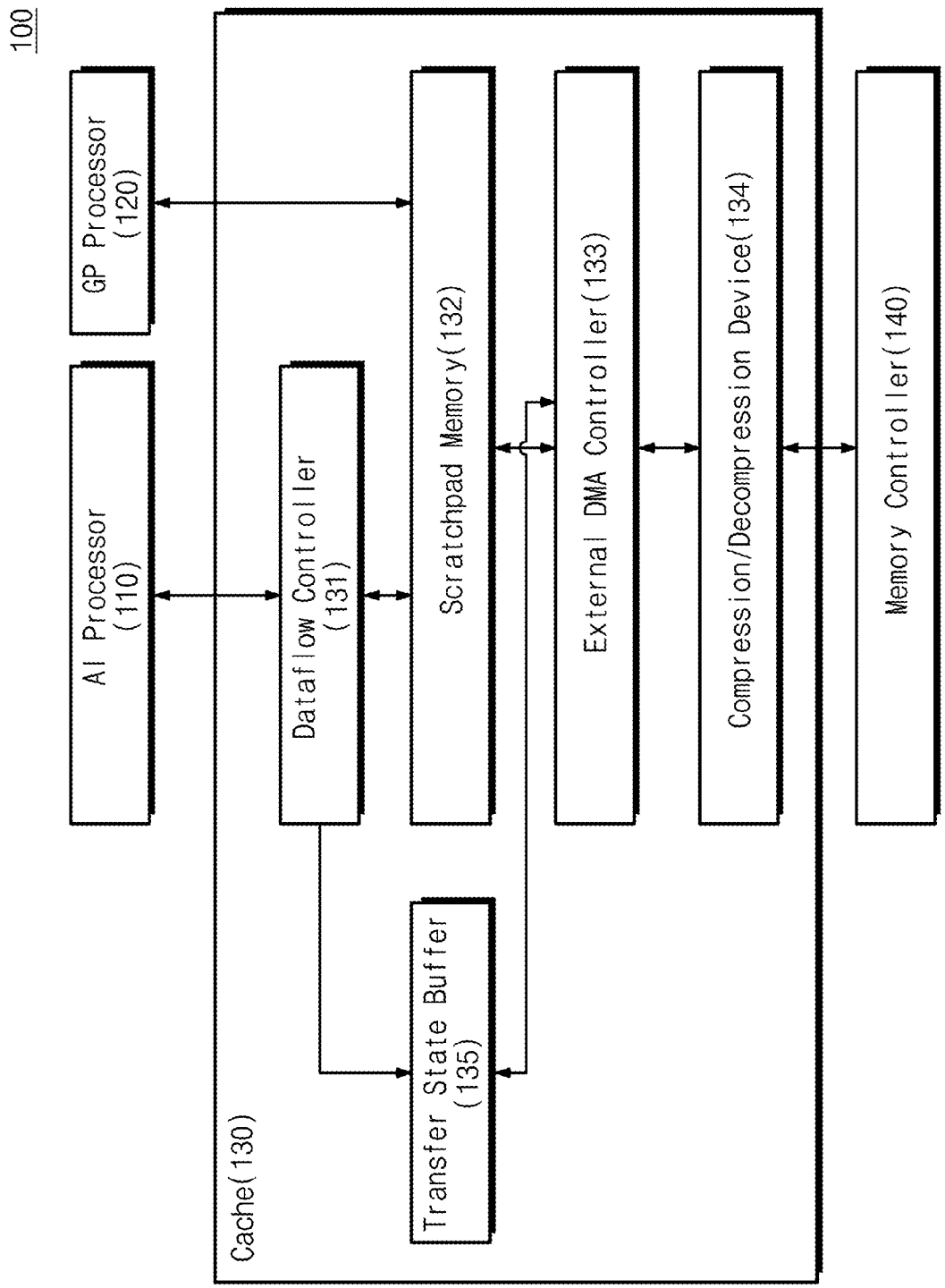
FIG. 1 illustrates a configuration of a system including a cache for an AI processor according to an embodiment of the present disclosure.

FIG. 1 illustrates a configuration of a system 100 including a cache for an AI processor according to an embodiment of the present disclosure. The system 100 may perform an arithmetic operation based on an AI algorithm on feature data and kernel data, and may output the arithmetic operation result of the AI algorithm. Besides, the system 100 may compress or rearrange the feature data and the kernel data to accelerate the arithmetic operation based on the AI algorithm and to increase the efficiency of the arithmetic operation.

The system 100 may include an AI processor 110, a general-purpose processor 120, a cache 130, and a memory controller 140. Furthermore, the system 100 may further include one or more external memories to store data associated with the AI algorithm. However, for brevity of illustration, the external memory is omitted.

The AI processor 110 may process the AI algorithm that computes the feature data and the kernel data based on a specific network (i.e., a neural network) structure. For example, the AI algorithm may be at least one of a convolution neural network (CNN), a recurrent neural network (RNN), or a generative adversarial network (GAN) that performs machine learning. However, the present disclosure is not limited thereto.

The AI processor 110 may store data to be processed or the processed data in the cache 130 depending on the AI algorithm. Also, the AI processor 110 may transmit data to the memory controller 140 through the cache 130 and may receive data from the memory controller 140 through the cache 130. For example, the AI processor 110 may include at least one of processing units such as a central processing unit (CPU), a graphics processing unit (GPU), a neural network processing unit (NPU), an accelerated processing unit (APU), or a tensor processing unit (TPU), but the present disclosure is not limited thereto.

The general-purpose processor 120 may perform pre-processing on the data to be processed by the AI processor 110 and may perform post-processing on the computation result by the AI processor 110. In particular, the general-purpose processor 120 may convert data received from outside into data having a format suitable for processing by the AI processor 110, by performing pre-processing on the feature data and the kernel data. For example, the pre-processing on data may include removing missing and/or unnecessary feature data, converting the feature data formed of characters to a numeric format, adjusting the range of the feature data converted to the numeric format, setting an initial weight, or the like.

Moreover, the general-purpose processor 120 may perform post-processing on the computation result by the AI processor 110, and thus may correct errors included in the computation result or improve the final quality of the computation result. The general-purpose processor 120 may receive the data processed by the AI processor 110 from the cache 130, and may store the pre-processing result for the data received from the outside or the post-processing results for the data processed by the AI processor 110, in the cache 130. For example, the general-purpose processor 120 may include at least one of general-purpose processing units such as a central processing unit (CPU), a graphics processing unit (GPU), or a data processing unit (DPU), but the present disclosure is not limited thereto.

The cache 130 may store data processed by the AI processor 110 or the general-purpose processor 120 and the result of performing computation of the AI processor 110 or the general-purpose processor 120. Also, the cache 130 may read out data from an external memory through the memory controller 140 and may transmit the read data to the AI processor 110 or the general-purpose processor 120. The cache 130 may include a dataflow controller 131, a scratchpad memory (shared scratchpad memory) 132, an AI external direct memory access (DMA) controller 133, a compression/decompression device 134, and a transfer state buffer 135.

The dataflow controller 131 may transmit data (e.g., feature data and kernel data) required by the AI processor 110 to the AI processor 110, and may transmit the result (e.g., output feature data) of performing computation of the AI processor 110 to an external memory through the scratchpad memory 132.

In particular, the dataflow controller 131 may be connected to the AI processor 110 and the scratchpad memory 132, and may transmit the result of performing computation of the AI processor 110 to the scratchpad memory 132. Besides, the dataflow controller 131 may receive data to be processed by the AI processor 110, from the scratchpad memory 132. The data exchange between the dataflow controller 131 and the scratchpad memory 132 may be performed based on transfer state information stored in the transfer state buffer 135.

The scratchpad memory 132 may store data capable of being exchanged between the dataflow controller 131 and the external DMA controller 133. In particular, the scratchpad memory 132 may store feature data and kernel data, which are to be processed by the AI processor 110. In addition, the scratchpad memory 132 may store the result of performing computation of the AI processor 110. The data stored in the scratchpad memory 132 may be provided to the memory controller 140 through the external DMA controller 133 or may be provided to the AI processor 110 through the dataflow controller 131.

Furthermore, the scratchpad memory 132 may exchange data with the general-purpose processor 120. The general-purpose processor 120 may store pre-processed data or post-processed data in the scratchpad memory 132, and the scratchpad memory 132 may transmit data requiring to be pre-processed or post-processed, to the general-purpose processor 120. For example, the scratchpad memory 132 may be implemented with an on-chip memory in which SRAMs are integrated.

The external DMA controller 133 may access the external memory through the memory controller 140, using a DMA scheme. In particular, the external DMA controller 133 may receive data required by the AI processor 110 from an external memory independently from the operation of the AI processor 110, and then may transmit the received data to the scratchpad memory 132.

As a result, the AI processor 110 may simultaneously receive required data while processing the AI algorithm, thereby increasing the efficiency of AI algorithm processing. The data exchange between the scratchpad memory 132 and the external DMA controller 133 may be performed based on transfer state information stored in the transfer state buffer 135.

The compression/decompression device 134 may decompress data received from the memory controller 140 or may compress data provided to the memory controller 140. In particular, the compression/decompression device 134 may compress feature data and kernel data, which are to be processed by the AI processor 110, and may transmit the compressed feature data and the compressed kernel data to the memory controller 140. In addition, the compression/decompression device 134 may receive data required by the AI processor 110 among the compressed feature data and the compressed kernel data from the memory controller 140, and then may decompress the data.

The transfer state buffer 135 may store transfer state information associated with the data exchange between the dataflow controller 131 and the external DMA controller 133. In particular, the transfer state buffer 135 may store transfer state information associated with data transfer between the dataflow controller 131 and the scratchpad memory 132 and data transfer between the external DMA controller 133 and the scratchpad memory 132. The transfer state information will be described in more detail with reference to FIG. 3.

The memory controller 140 may control an external memory. For example, the memory controller 140 may control the external memory to receive the feature data and the kernel data required by the AI processor 110 from the external memory. Besides, the memory controller 140 may control the external memory to store the feature data, the kernel data, and the result of performing computation of the AI processor 110, in the external memory.

Figure 2:
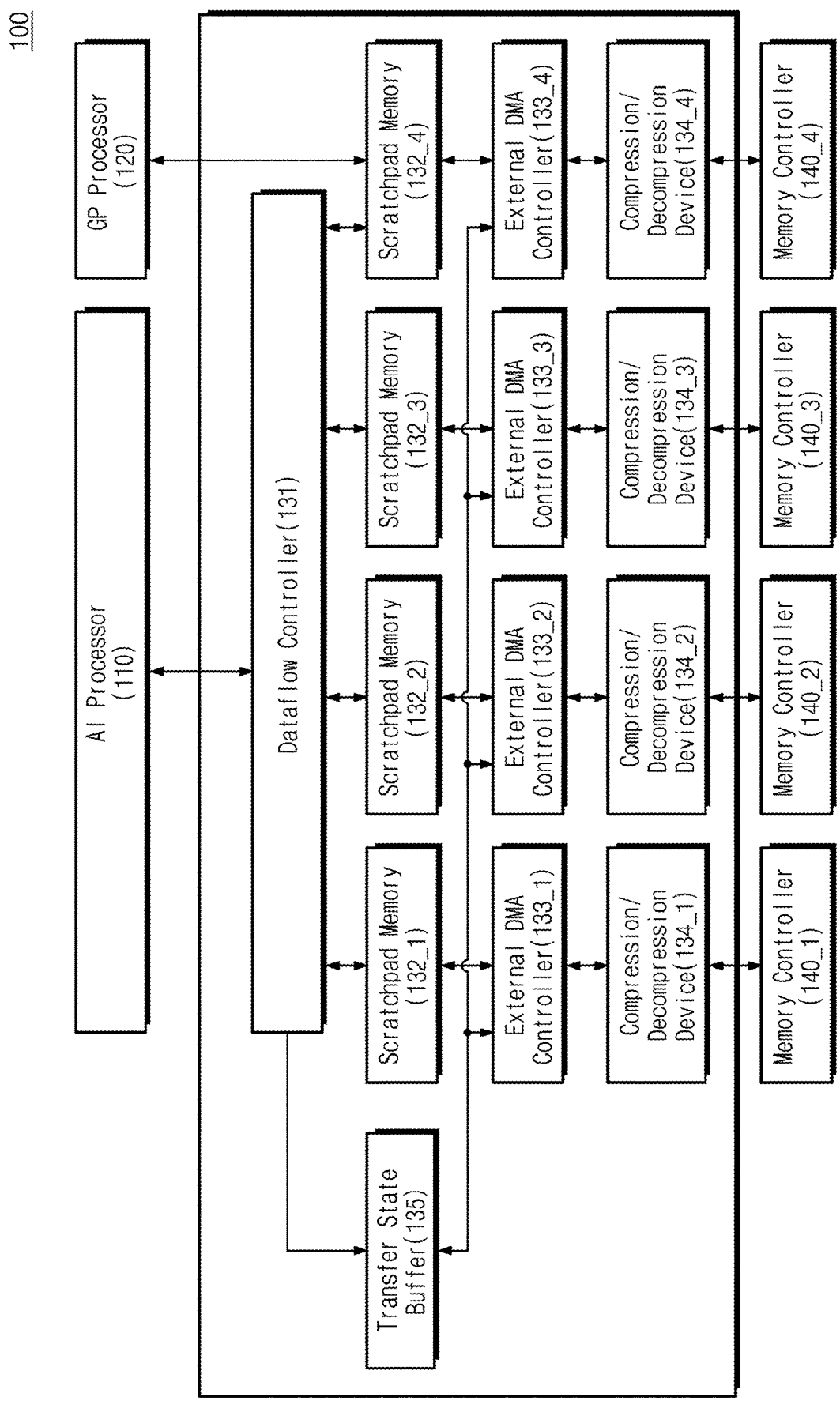
FIG. 2 illustrates a configuration of a system including a cache for an AI processor according to an embodiment of the present disclosure.

FIG. 2 illustrates a configuration of the system 100 including a cache for an AI processor according to an embodiment of the present disclosure. In particular, FIG. 2 illustrates a case where the system 100 illustrated in FIG. 1 includes a plurality of external memories. To control the plurality of external memories, the system 100 of FIG. 2 may include a plurality of memory controllers 140_1 to 140_4.

Furthermore, to exchange data with the plurality of memory controllers 140_1 to 140_4, the cache 130 of FIG. 2 may include a plurality of scratchpad memories 132_1 to 132_4, a plurality of external DMA controllers 133_1 to 133_4, and a plurality of compression/decompression devices 134_1 to 134_4.

In one embodiment, the system 100 of FIG. 2 is illustrated as including the four scratchpad memories 132_1 to 132_4, the four external DMA controllers 133_1 to 133_4, the four compression/decompression devices 134_1 to 134_4, and the four memory controllers 140_1 to 140_4. However, the present disclosure is not limited thereto, and the system 100 may include the different number of scratchpad memories from the number of scratchpad memories illustrated in FIG. 2, the different number of external DMA controllers from the number of external DMA controllers illustrated in FIG. 2, the different number of compression/decompression devices from the number of compression/decompression devices illustrated in FIG. 2, and the different number of memory controllers from the number of memory controllers illustrated in FIG. 2.

Furthermore, the scratchpad memory 132_4 of FIG. 2 is illustrated as exchanging data not only with the AI processor 110 but also with the general-purpose processor 120. In this case, data pre-processed or post-processed by the general-purpose processor 120 may be stored in only the scratchpad memory 132_4 and may not be transmitted to an external memory, but the present disclosure is not limited thereto.

Figure 3:
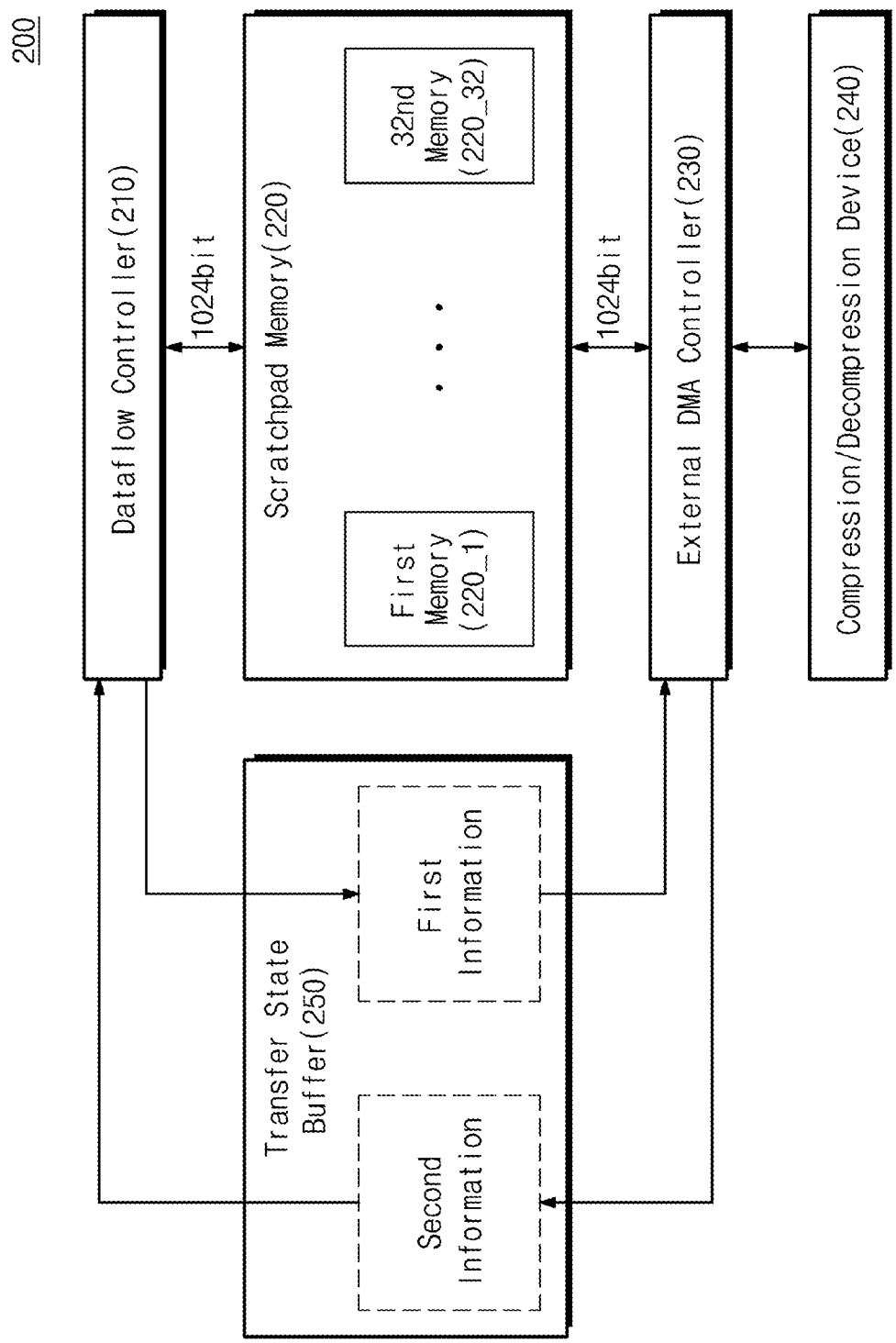
FIG. 3 illustrates an operation of a cache for an AI processor according to an embodiment of the present disclosure.

FIG. 3 illustrates an operation of a cache 200 for an AI processor according to an embodiment of the present disclosure. For example, the cache 200 may be the cache 130 of FIG. 1. As described with reference to FIG. 1, the cache 200 may include a dataflow controller 210, a scratchpad memory 220, an external DMA controller 230, a compression/decompression device 240, and a transfer state buffer 250.

As described above, the scratchpad memory 220 may be implemented with an on-chip memory in which SRAMs are integrated. As shown in FIG. 3, the scratchpad memory 220 may include, for example, 32 memories 220_1 to 220_32. For example, each of the 32 memories 220_1 to 220_32 may store 1024 bits of data.

The dataflow controller 210 and the external DMA controller 230 may exchange data through the scratchpad memory 220 based on the transfer state information stored in the transfer state buffer 250. For example, the transfer state buffer 250 may include dataflow controller transfer state information (hereinafter referred to as "first information") and external DMA controller transfer state information (hereinafter referred to as "second information").

In one embodiment, the first information may indicate how much the dataflow controller 210 writes data in the scratchpad memory 220, and how much the external DMA controller 230 reads data written by the dataflow controller 210. The second information may indicate how much the external DMA controller 230 writes data to the scratchpad memory 220, and how much the dataflow controller 210 reads the data written by the external DMA controller 230.

Moreover, the first information and the second information may indicate an address of a point at which data is written finally, and an address of a point at which data is read finally. That is, the first information may indicate an address (hereinafter referred to as a "first write address") at which the dataflow controller 210 starts writing data to the scratchpad memory 220, and an address (hereinafter referred to as a "first read address") at which the external DMA controller 230 starts reading data from the scratchpad memory 220. Also, the second information may indicate an address (hereinafter referred to as a "second write address") at which the external DMA controller 230 starts writing data to the scratchpad memory 220, and an address (hereinafter referred to as a "second read address") at which the dataflow controller 210 starts reading data from the scratchpad memory 220.

Accordingly, the dataflow controller 210 may write data to be transmitted to the external DMA controller 230 in the first write address of the scratchpad memory 220 based on the first information. Furthermore, the external DMA controller 230 may read data from the first read address of the scratchpad memory 220 based on the first information by means of the dataflow controller 210.

In addition, the external DMA controller 230 may write data to be transmitted to the dataflow controller 210 in the second write address of the scratchpad memory 220 based on the second information. Besides, the dataflow controller 210 may read data from the second read address of the scratchpad memory 220 based on the second information. As a result, operations of reading and writing data may be performed seamlessly.

Figure 4:
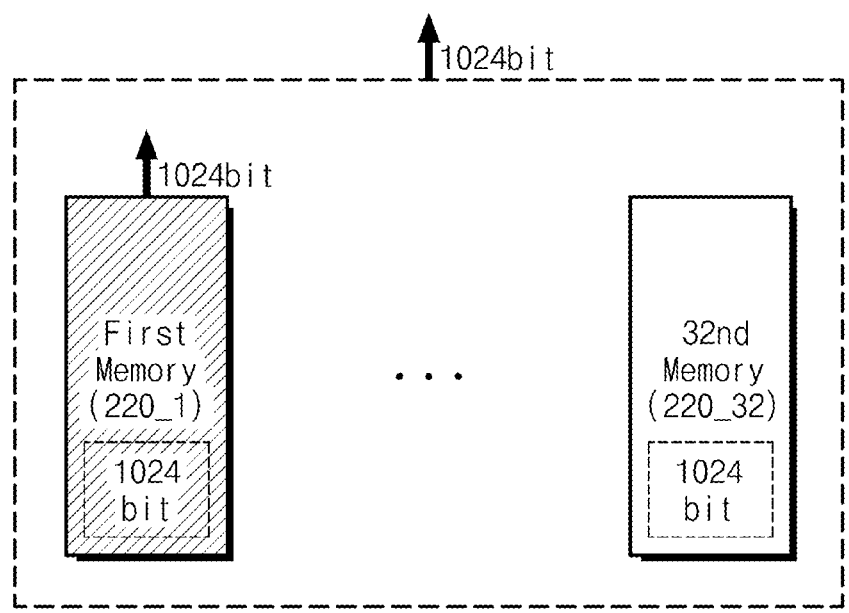
FIG. 4 illustrates a normal mode during an operation of a scratchpad memory.
Figure 5:
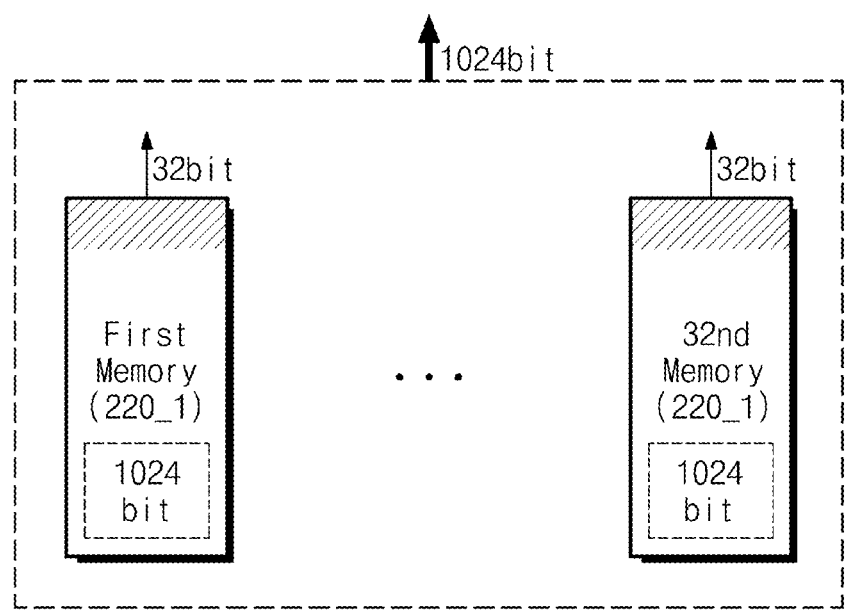
FIG. 5 illustrates a transpose mode during an operation of a scratchpad memory.

Hereinafter, it will be described how the scratchpad memory 220 reads and writes data, with reference to FIGS. 4 to 5. FIG. 4 illustrates a normal mode during an operation of a scratchpad memory. FIG. 5 illustrates a transpose mode during an operation of a scratchpad memory.

As shown in FIG. 3, the scratchpad memory 220 may include the plurality of memories 220_1 to 220_32. For clarity of illustration, it is assumed that each of the plurality of memories 220_1 to 220_32 is capable of storing 1024 bits of data. Moreover, it is assumed that the dataflow controller 210 or the external DMA controller 230 is capable of writing 1024 bits of data in the scratchpad memory 220 or capable of reading 1024 bits of data from the scratchpad memory 220 at a time.

The data writing operation of the scratchpad memory 220 in a normal mode may be the same as the data writing operation of the scratchpad memory 220 in a transpose mode. The dataflow controller 210 or the external DMA controller 230 may sequentially write 1024 bits of data from the first memory 220_1 to the 32nd memory 220_32. Accordingly, as shown in FIGS. 4 to 5, each of the memories 220_1 to 220_32 may store 1024 bits of data.

In the meantime, the data reading operation of the scratchpad memory 220 in the normal mode may be different from the data reading operation of the scratchpad memory 220 in the transpose mode. In the normal mode shown in FIG. 4, read operations may be performed in the order in which data is stored in the memories 220_1 to 220_32. That is, when data reading operation is performed in units of 1024 bits, as shown by the hatched portion of FIG. 4, a read operation may be first performed on 1024 bits of data stored in the first memory 220_1, and then read operations may be sequentially performed on data of each of the remaining memories. Accordingly, it may be impossible to perform data reading operations in the arbitrary order required by the AI algorithm.

On the other hand, in the case of the transpose mode shown in FIG. 5, a read operation may be performed regardless of the order in which data is stored. That is, when a data reading operation is performed in units of 1024 bits, as shown by the hatched portion of FIG. 5, a read operation may be performed on each of the memories 220_1 to 220_32 in units of 32 bits without performing a read operation on 1024 bits of data stored in a single memory. Accordingly, data reading operations may be performed in the arbitrary order required by the AI algorithm.

In other words, when the scratchpad memory 220 is operated in the transpose mode, the dataflow controller 210 or the external DMA controller 230 may read data required from each of the memories 220_1 to 220_32 regardless of the order in which data is stored. Accordingly, when the scratchpad memory 220 of the present disclosure operates in the transpose mode, the number of times of accessing an external memory and an internal memory may be reduced.

The above description refers to embodiments for implementing the present disclosure. The present disclosure in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims According to an embodiment of the present disclosure, it is possible to reduce the number of times of accessing an external memory to rearrange feature data and kernel data in an AI processor.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A cache for an artificial intelligence (AI) processor for processing an AI algorithm, the cache comprising:
    a dataflow controller configured to transmit first data to the AI processor and to receive second data from the AI processor;
    an external direct memory access (DMA) controller configured to receive the first data from an external memory to transmit the first data to the dataflow controller and to receive the second data from the dataflow controller to transmit the second data to the external memory;
    a scratchpad memory configured to store the first data or the second data transmitted between the dataflow controller and the external DMA controller;
    a compression/decompression device configured to compress the second data to be transmitted from the scratchpad memory to the external memory, and to decompress data transmitted from the external memory, wherein decompressed data is transmitted as the first data to the scratchpad memory through the external DMA controller; and
    a transfer state buffer configured to store transfer state information associated with data transfer between the dataflow controller and the external DMA controller,
    wherein the first data includes feature data and kernel data, and the second data includes output feature data that is a result of computation performed by the AI processor.

2. The cache of claim 1, wherein the scratchpad memory transmits the first data to a general-purpose processor to perform pre-processing on the first data or the second data to the general-purpose processor to perform post-processing on the second data, and receives pre-processed data or post-processed data from the general-purpose processor, and
    wherein the dataflow controller transmits the pre-processed data to the AI processor, and the external DMA controller transmits the post-processed data to the external memory.

3. The cache of claim 1, wherein the transfer state buffer stores first information and second information,
    wherein the first information indicates an amount of data to be written by the dataflow controller in the scratchpad memory, and a first write address at which the dataflow controller writes data in the scratchpad memory, and
    wherein the second information indicates an amount of data to be written by the external DMA controller in the scratchpad memory, and a second write address at which the external DMA controller writes data in the scratchpad memory.

4. The cache of claim 3, wherein the first information further indicates an amount of data to be read by the external DMA controller from the scratchpad memory, and a first read address at which the external DMA controller reads data from the scratchpad memory, and
    wherein the second information further indicates an amount of data to be read by the dataflow controller from the scratchpad memory, and a second read address at which the dataflow controller reads data from the scratchpad memory.

5. The cache of claim 4, wherein the dataflow controller writes the second data to be transmitted to the external DMA controller at the first write address of the scratchpad memory and reads the second data received from the external DMA controller, from the second read address of the scratchpad memory, and
    wherein the external DMA controller writes the first data to be transmitted to the dataflow controller at the second write address of the scratchpad memory and reads the second data received from the dataflow controller, from the first read address of the scratchpad memory.

6. The cache of claim 1, wherein the scratchpad memory includes a plurality of memories, and
    wherein data is sequentially stored in each of the plurality of memories in order.

7. The cache of claim 6, wherein the scratchpad memory performs a data reading operation depending on an order of the stored data.

8. The cache of claim 6, wherein the scratchpad memory performs a data reading operation regardless of an order of the stored data.

9. The cache of claim 2, wherein the AI processor includes at least one of a central processing unit (CPU), a graphics processing unit (GPU), a neural network processing unit (NPU), an accelerated processing unit (APU), or a tensor processing unit (TPU).

* * * * *